United States Patent [19]
Isobe et al.

[11] Patent Number: 4,982,335
[45] Date of Patent: Jan. 1, 1991

[54] SYSTEM FOR PROCESSING MST FUNCTION COMMAND

[75] Inventors: Shinichi Isobe, Minamitsuru; Yoshiaki Ikeda, Hachioji, both of Japan

[73] Assignee: Fanuc Ltd., Minamitsuru, Japan

[21] Appl. No.: 309,665

[22] PCT Filed: Jun. 14, 1988

[86] PCT No.: PCT/JP88/00584
§ 371 Date: Feb. 6, 1989
§ 102(e) Date: Feb. 6, 1989

[87] PCT Pub. No.: WO88/10451
PCT Pub. Date: Dec. 29, 1988

[30] Foreign Application Priority Data
Jun. 26, 1987 [JP] Japan .................... 62-159404

[51] Int. Cl.$^5$ .............................. G05B 19/18
[52] U.S. Cl. .................... 364/474.01; 364/148
[58] Field of Search .............. 364/474.01, 148, 474.18

[56] References Cited
U.S. PATENT DOCUMENTS

| | | | |
|---|---|---|---|
| 4,229,804 | 10/1980 | Kobayashi et al. | 364/474.01 X |
| 4,511,975 | 4/1985 | Nozawa et al. | 364/474.19 |
| 4,692,872 | 9/1987 | Kiya | 364/474.23 |
| 4,714,999 | 12/1987 | Kiya et al. | 364/474.22 |
| 4,725,943 | 2/1988 | Kuriyama et al. | 364/474.19 X |
| 4,787,049 | 11/1988 | Hirata et al. | 364/474.15 |

FOREIGN PATENT DOCUMENTS

| | | |
|---|---|---|
| 0081588 | 6/1983 | European Pat. Off. . |
| 0169912 | 2/1986 | European Pat. Off. . |
| 0188621 | 7/1986 | European Pat. Off. . |
| 0189506 | 8/1987 | Japan . |

Primary Examiner—Allen MacDonald
Attorney, Agent, or Firm—Staas & Halsey

[57] ABSTRACT

A system for processing an MST function command in a numerical control system including a computerized numerical control apparatus (CNC, 10) and a PMC (programmable machine controller). A strobe signal MF, SF, TF is issued from the computerized numerical control apparatus (10) in an opposite logic state to that of a finish signal MFIN, SFIN, TFIN. The PMC (20) determines that there is a command when the strobe signal is of the opposite logic state to that of the finish signal being issued. When the execution of an MST function is finished, the finish signal is converted to a logic state opposite to that of the strobe signal MF, SF, TF. The computerized numerical control apparatus (10) determines that the processing of the MST function is finished when the logic state of the finish signal becomes identical to that of the strobe signal. When the finish signal and the strobe signal become different from each other as to their logic states, therefore, it can be determined that there is a command. When the strobe signal and the finish signal become identical to each other as to their logic states, the completion of the MST function is determined. Therefore, no cycle for signal confirmation is necessary, thus resulting in a reduced processing time.

6 Claims, 6 Drawing Sheets

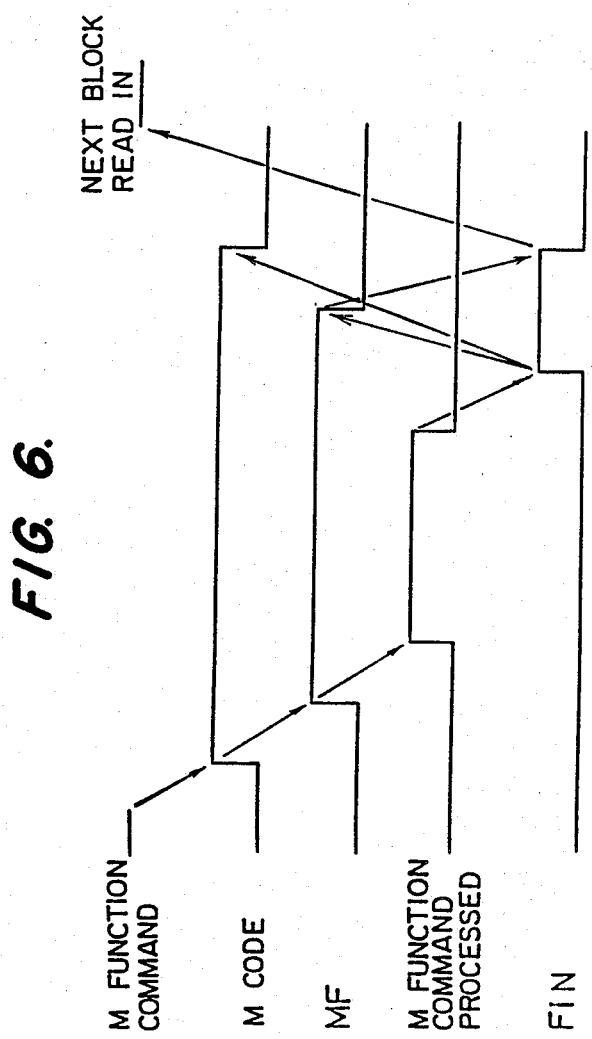

SYSTEM FOR PROCESSING MST FUNCTION COMMAND

BACKGROUND OF THE INVENTION

1. Technical Field

The present invention relates to a system for processing an MST function command in a numerical control system comprising a computerized numerical control apparatus (CNC) and a PMC (programmable machine controller), and more particularly to a system for processing an MST function command, which is especially capable of confirming a finish signal for an MST function at a high speed.

2. Background Art

In computerized numerical control (CNC) systems, an MST function command is issued from a computerized numerical control apparatus (CNC) and executed by a PMC (programmable machine controller). When the execution of the MST function is finished, a finish signal (FIN) is issued to continue the processing. The MST function collectively refers to an M function, an S function, and a T function.

One example of such a system is illustrated in FIG. 5 of the accompanying drawings Denoted at 31 is a processor in a computerized numerical control apparatus (CNC), 32 a common RAM, and 33 a processor in a PMC (programmable machine controller). In the computerized numerical control apparatus (CNC), a received MST function command is issued through the common RAM 32 to the processor 33. For example, a strobe signal MF and an M code signal of an M function are issued. The processor 33 in the PMC receives these issued signals, and executes the M function, after which a finish signal FIN is sent back to the processor 31 through the common RAM 32. The processor 31 then executes a next command. The processing in the computerized numerical control apparatus (CNC) and the PMC (programmable machine controller) is continued in the above manner.

FIG. 6 is a timing chart of a sequence for processing the M function in the computerized numerical control apparatus (CNC) and the PMC (programmable machine controller).

When the computerized numerical control apparatus reads an M function command, it issues an M code signal and, after a certain period of time, issues a strobe signal MF which is then received by the PMC to execute the corresponding M function. After completion of the M function, the PMC sends a finish signal FIN back to the computerized numerical control apparatus. In response to the signal FIN, the computerized numerical control apparatus removes the strobe signal MF and the code signal. The PMC removes the signal FIN upon confirmation of removal of the strobe signal MF. Upon confirmation of the removal of the signal FIN, the computerized numerical control apparatus reads and executes a next block. S and M functions can be processed in the same manner as described above with respect to the T function.

A conventional interface comprising relays has been employed to transmit and receive the finish signal FIN. Since this interface continues a sequence while confirming each signal from the transmitting terminal in view of chattering of the relays or the like, operation of the interface is time-consuming. The present system which transmits and receives signals through the RAM 32 between the computerized numerical control apparatus and the PMC as shown in FIG. 5 is thus wasteful of a long amount of time. In the PMC, for example, it is necessary to turn on the finish signal FIN, confirm the turning-off of the signal MF, and turn off the finish signal FIN. Processing the finish signal FIN takes about the same amount of time which is required to process three cycles of a control program in the PMC.

Inasmuch as one cycle of a normal PMC control program is processed in slightly less than 70 ms, the finish signal FIN is processed in about 200 ms. A program for a small-size numerically controlled lathe, numerically controlled automatic machine tool, or the like to process a single workpiece contains several tens of MST function commands. It requires about several seconds to several tens of seconds just to process finish signals for those MST function signals. This processing time is not negligible as compared with the overall machining time.

SUMMARY OF THE INVENTION

It is an object of the present invention to provide a system for processing an MST function command which will solve the aforesaid problems and which is capable of confirming a finish signal for an MST function at a high speed.

To solve the above problems, there is provided in accordance with the present invention, as shown in FIG. 1, a system for processing an MST function command in a numerical control system comprising a computerized numerical control apparatus (CNC, 10) and a PMC (programmable machine controller), the processing system comprising:

finish signal confirming means (11) for confirming the logic state of a finish signal (MFIN, SFIN, TFIN) in the PMC (20);

MST function issuing means (12) for issuing a strobe signal (MF, SF, TF) and a code signal for the MST function command which is of an opposite logic state to that of the finish signal (MFIN, SFIN, TFIN);

finish determining means (13) for confirming the finish of an MST function by determining that the logic state of the strobe signal (MF, SF, TF) is the same as that of the finish signal (MFIN, SFIN, TFIN);

MST function command determining means (21) for determining whether there is an MST function command or not by determining that said strobe signal (MF, SF, TF) from the computerized numerical control apparatus (CNC) is different from said finish signal (MFIN, SFIN, TFIN);

MST function command executing means (22) for executing an MST function command based on the determination of said MST function command determining means (21); and finish signal issuing means (23) for issuing a finish signal (MFIN, SFIN, TFIN) of the same logical state as that of said strobe signal (MF, SF, TF) when the MF function is finished.

A strobe signal MF, SF, TF is issued from the computerized numerical control apparatus in an opposite logic state to that of a finish signal MFIN, SFIN, TFIN.

The PMC determines that a command is present when the logic state of the strobe signal becomes opposite to that of the finish signal being issued. When the execution of an MST function is finished, the logic state of the finish signal is rendered identical to that of the strobe signal MF, SF, TF.

The computerized numerical control apparatus determines that the processing of the MST function is finished when the logic state of the finish signal becomes identical to that of the strobe signal.

When the finish signal and the strobe signal become different from each other as to their logic states, therefore, it can be determined that there is a command. When the strobe signal and the finish signal become identical to each other as to their logic states, the completion of the MST function is determined. Therefore, no cycle for signal confirmation is necessary, thus resulting in a reduced processing time.

BRIEF DESCRIPTION OF THE DRAWINGS

FIG. 6 is a timing chart of a conventional processing sequence for an M function.

DETAILED DESCRIPTION OF THE PREFERRED EMBODIMENT

Embodiments of the present invention will hereinafter be described in specific detail with reference to the drawings.

Figure 1:
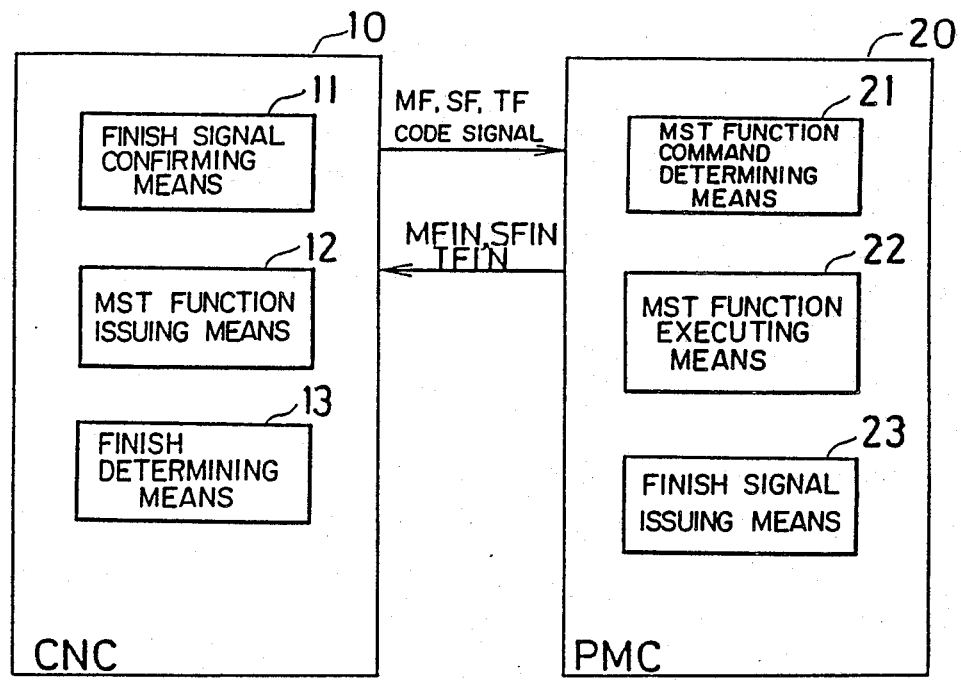
FIG. 1 is a block diagram of an embodiment of the present invention.

FIG. 1 is a block diagram of an embodiment of the present invention in block form. Denoted at 10 is a computerized numerical control apparatus (CNC) and 20 a PMC (programmable machine controller). An MST function command is issued from the computerized numerical control apparatus 10 to the PMC 20. The MST function command is composed of strobe signals MF, SF, TF and code signals for respective functions.

The PMC 20 executes the MST functions and then issues finish signals MFIN, TFIN, SFIN for M, S, T functions to the computerized numerical control apparatus 10.

The M function will hereinafter be described for the sake of brevity. The S and T functions are the same as the M function as to operation. Designated at 11 is a finish signal confirming means for confirming the logic state of a finish signal MFIN from the PMC, 12 an MST function issuing means for converting a strobe signal MF to a signal having a logic state opposite to that of the finish signal MFIN when an M function command is received, and 13 a finish determining means, the function of which will be described below.

Denoted at 21 is an MST function command determining means for determining that there is an M function command when the logic states of signals MF, MFIN are different from each other, 22 an MST function executing means for executing a corresponding M function, and 23 a finish signal issuing means for confirming the logic state of the signal MF and converting the finish signal MFIN to a signal having the same logic state as the signal MF when the M function is executed by the MST function executing means 22. The finish determining means 13 determines the completion of the M function when the logic states of the signals MFIN, MF become identical to each other.

A sequence of operation can thus be performed while checking the logic states of the signals MF, MFIN to confirm the command or finish condition. Therefore, no cycle for exchanging signals used only for confirmation is necessary. The logic states can be confirmed by exclusive-ORing the signals MF, MFIN so that a command is present when the result of the exclusive-ORing process is "1" and the execution of an M function is finished when the result of the exclusive-ORing process is "0".

Figure 2:
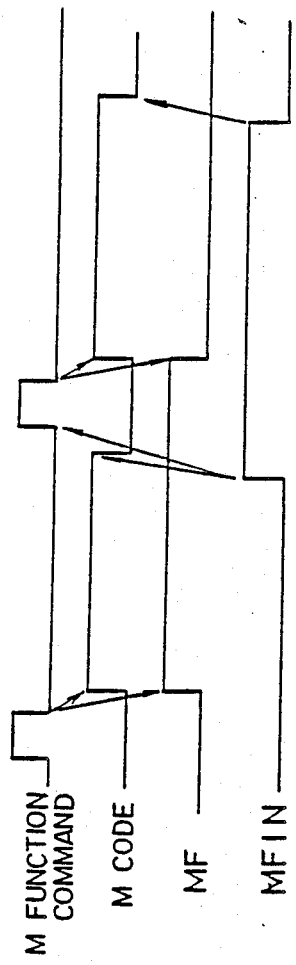
FIG. 2 is a timing chart of operation of the embodiment of the invention.

FIG. 2 shows a timing chart of a processing sequence of the present embodiment. When an M function command is applied, a corresponding M code is issued. Since a signal MFIN is of a logic "0", a signal MF is of a logic "1". As the logic states of the signals MF, MFIN are different in the PMC, the PMC determines that there is an M function command and executes the corresponding M function. When the execution of the M function is finished, since the signal MF is of "1", the PMC converts the signal MFIN to one of a logic state "1". Because the logic states of the signals MF, MFIN become identical to each other, the computerized numerical control apparatus determines that the execution of the M function is finished, and then reads in a next M function command. When the new M function is read, the computerized numerical control apparatus issues a corresponding M code signal. Inasmuch as the signal MFIN is of "1", the signal MF is converted to a logic state "0". With the signals MF, MFIN being different from each other as to their logic states, the PMC determines that there is a new function command and executes a corresponding M function. Upon completion of the execution of the M function command, the signal MFIN is converted to a logic state "0" which is the same as that of the signal MF. As the logic states of the signals MF, MFIN become the same as each other, the computerized numerical control apparatus determines the completion of the execution of the M function. In this manner, the computerized numerical control apparatus determines the completion of the execution of the M function based on the same logic states of the signals MF, MFIN, and the PMC determines the application of the M function command based on the different logic states of the signals MF, MFIN. Accordingly, there is no need for a sequence for confirming the presence of a command or the completion of the execution of a command, and the execution of an MST function can be processed within a short period of time.

Figure 3:
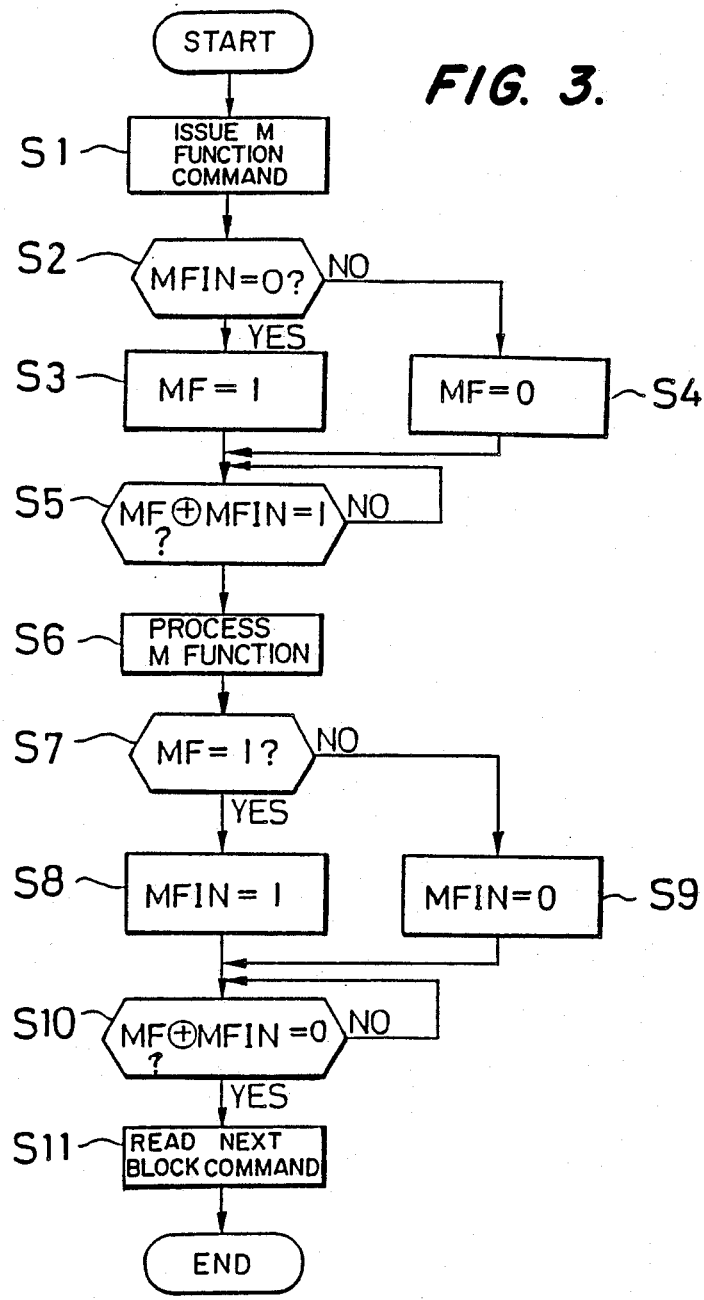
FIG. 3 is a flowchart of a processing sequence of the embodiment of the invention.

FIG. 3 is a flowchart for the present embodiment. Numerals following "S" in FIG. 3 indicate the numbers of steps.

(S1) An M function is commanded.

(S2) It is determined whether MFIN is of "0" or not. If "1", then control goes to S3, and if "0", then control goes to S4.

(S3) Since MFIN is of "0", MF is set to "1".

(S4) Since MFIN is of "1", MF is set to "0".

(S5) MF and MFIN are exclusive-ORed. If the result is "1", since MF and MFIN are different, control goes to S6. If the result is "0", control waits until the result becomes "1".

(S6) A corresponding M function is executed.

(S7) The execution of the M function is finished, and it is determined whether the logic state of MF is "1" or not. If "1", then control goes to S8, and if "0", then control goes to S9.

(S8) Since MF is of "1", MFIN is set to "1".

(S9) Since MF is of "0", MFIN is set to "0".

(S10) MF and MFIN are exclusive-ORed. If the result is "0", then control goes to S11, and if the result is "1", then control waits until the result becomes "0".

(S11) Since the result of exclusive ORing MF and MFIN is "0" and hence MF and MFIN are of the same logic state, it is determined that the execution of the M function is finished, and a next block command is read in.

As described above, the PMC determines the application of an M function command based on the different logic states of the signals MF and MFIN, and the computerized numerical control apparatus determines the completion of an M function based on the same logic state of the signals MF and MFIN. Consequently, it is not necessary to include any sequence for confirming the presence of a command or the completion of a command, and an MST function can be executed within a short period of time.

Figure 4:
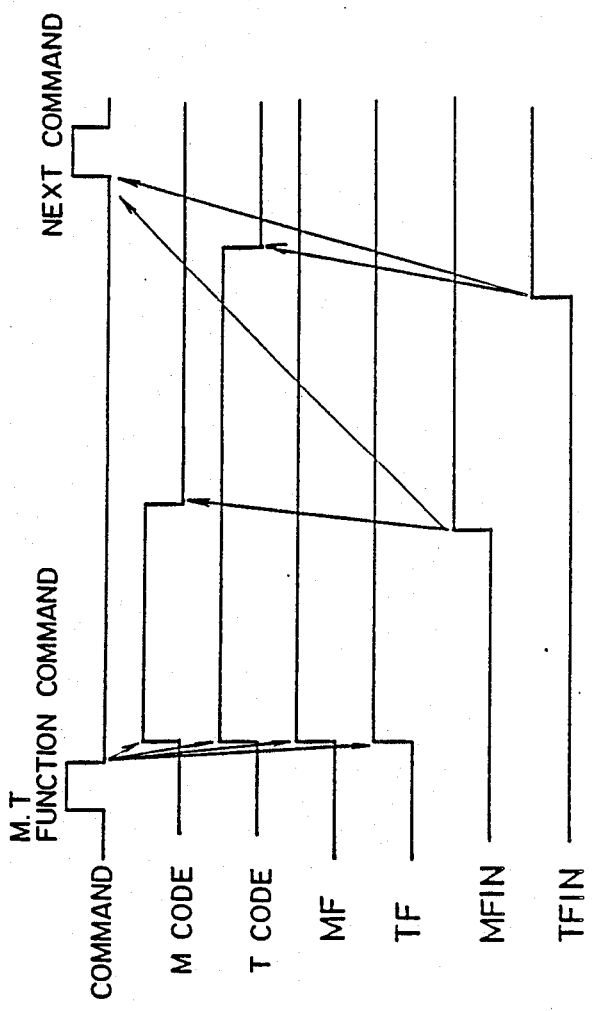
FIG. 4 is a timing chart of operation of another embodiment of the present invention.
Figure 5:
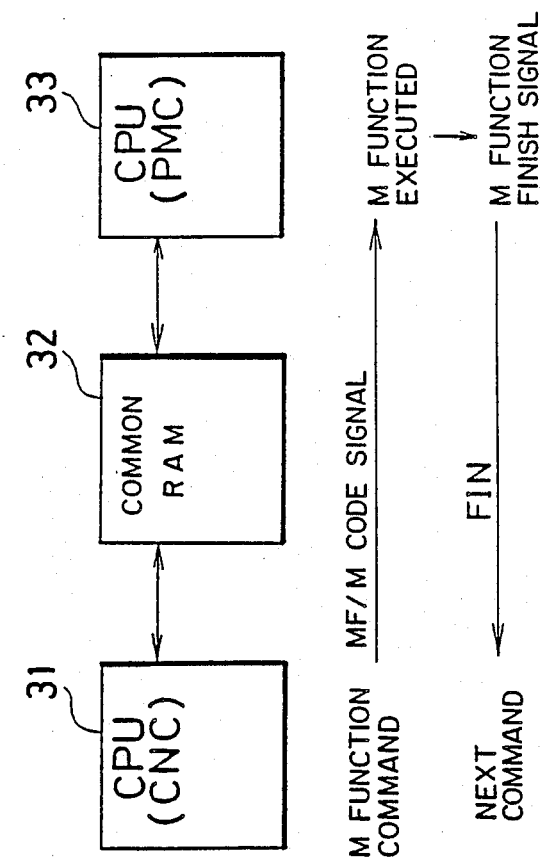
FIG. 5 is a diagram showing an interface between a computerized numerical control apparatus and a PMC.

FIG. 4 shows a timing chart similar to the timing chart of FIG. 2. In the example of FIG. 4, an M function and a T function are simultaneously commanded. A block containing both M and T functions is finished, as seen from the computerized numerical control apparatus, when both M and T functions are finished More specifically, the completion of the M function is confirmed when both MF and MFIN are of "1", and the completion of the T function is determined when a strobe signal TF is "1" and a finish signal TFIN for the T function is "1". The application of a TF function command is determined when TF is "1" and TFIN is "0". The other details are the same as those shown in FIG. 2, and will not be described.

While the M function has been described, the other S and T functions are processed in the same manner. As described above with reference to FIG. 4, when M and T functions are simultaneously commanded, their block is finished when the completion of both M and T functions is confirmed. When M, S, and T functions are simultaneously commanded in one block, the block is finished upon completion of the execution of all of these functions.

The processing of functions in the computerized numerical control apparatus (CNC) and the PMC (programmable machine controller) has been described above. However, an MST function can be processed in the same manner as described above in a PC (programmable controller) and a computerized numerical control apparatus (CNC) which are independent of each other.

With the present invention, as described above, the presence of a command and the completion of the execution of a command are confirmed based on the logic states of a strobe signal and a finish signal. Therefore, no special cycle is required for confirming the presence of a command and the completion of the execution of a command. The processing of an MST function can be shortened, and hence a numerically controlled machining process can be shortened.

What is claimed is:

1. A system for processing an MST function command in a numerical control system including a computerized numerical control apparatus (CNC) and a PMC (programmable machine controller), comprising:

finish signal confirming means for confirming the logic state of a finish signal in the PMC;

MST function issuing means in the CNC for issuing a strobe signal and a code signal corresponding to the MST function command, which is of a logic state opposite to that of the finish signal;

finish determining means for confirming the finish of an MST function by determining that the logic state of the strobe signal is the same as that of the finish signal;

MST function command determining means for determining whether there is an MST function command or not by determining that the strobe signal from the computerized numerical control apparatus (CNC) is different from the finish signal;

MST function command executing means for executing an MST function command based on the determination of said MST function command determining means; and finish signal issuing means for issuing a finish signal of the same logical state as that of the strobe signal when the MST function is finished.

2. A system according to claim 1, wherein one of an M function, an S function, and a T function of the MST function command is singly processed.

3. A system according to claim 1, wherein at least two of M, S and T functions of the MST function command are simultaneously processed.

4. A system for processing an MST function command in a numerical control system, comprising:

a computerized numerical control apparatus including:

MST function issuing means for issuing a strobe signal and a code signal corresponding to an MST function command, the strobe signal having a first logic state;

finish signal confirming means for confirming the logic state of a finish signal; and finish determining means for confirming completion of an MST function; and a programmable machine controller coupled to said numerical control apparatus, including:

finish signal issuing means for issuing the finish signal of the first logic state when the MST function is completed;

MST function command determining means for determining whether there is an MST function command by determining that the strobe signal has a different logic state than the finish signal; and MST function command executing means for executing the MST function command based on the determination of said MST function command determining means.

5. A system according to claim 4, wherein one of an M function, an S function and a T function of the MST function command, is individually processed.

6. A system according to claim 4, wherein at least two of an M function, an S function and a T function of the MST function command, are simultaneously processed.

* * * * *